UNITED STATES PATENT OFFICE 2,379,723

PARASITICIDAL PREPARATIONS

Elbert C. Ladd, Passaic, N. J., assignor to United States Rubber Company, New York, N. Y., a corporation of New Jersey No Drawing. Application February 7, 1944, Serial No. 521,433

11 Claims. (Cl. 167—33)

This invention relates to new and useful improvements in parasiticidal preparations, more particularly to germicides, that is, fungicides and bactericides, and to preparations for repelling insects, including larvae, arachnids and acarids. The invention further relates to methods of protecting organic materials subject to attack by low orders of organisms, as the immunizing of seed, and the mildewproofing of fabrics and other material.

I have found that N-nitroso-phthalimidine is effective for destroying or checking the growth of fungi and bacteria and repelling insects. The structure of the compound may be represented as follows:

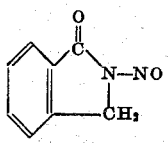

The compound and method of preparation are described by Graebe in Beilstein's "Handbuch der Organischen Chemie," vol 21, page 287 (4th edition).

The N-nitroso-phthalimidine may be used as a seed protectant and to protect plants, including plant parts, or soil from organisms harmful to seeds and plants. It may also be applied to prevent or retard fungus growth and the formation of mildew, for example, on organic material, such as rope, wood, fur, hair, feathers, cotton, wool, leather, rubber, rubberized or synthetic resin coated fabric, and the like. The N-nitroso-phthalimidine may be applied as dust or spray, or in solution in a suitable solvent, or in suspension in a non-solvent medium, for example, water. It may be applied diluted or undiluted, or mixed with carriers, or other fungicides, germicides, or insect repellents, or with insecticides, fertilizers, hormones, buffering or safening agents.

The following examples are given to illustrate the invention:

Example I

Pea seed variety Perfection were tumbled with various proportions of N-nitroso-phthalimidine in dust form. The seeds were then planted in soil known to be infected with a number of organisms including *Pythium ultimum*. The effectiveness of the compound as a fungicide was determined by comparing the numbers of seeds which germinated and developed into healthy plants from equal numbers of treated and untreated seeds planted under the same conditions. Observations were made at the end of 14 days on the seeds treated with various dosages of the N-nitroso-phthalimidine. The results are shown in the following table:

| Dosage of N-nitroso-phthalimidine in per cent of seed weight | Per cent germination after 14 days | |
|---|---|---|
| | Treated | Untreated |
| 1 | 95 | 23 |
| .5 | 80 | 15 |
| .25 | 85 | 23 |
| .125 | 73 | 12 |
| .063 | 77 | 21 |

The untreated seed, and seedlings which developed from the untreated seed, were observed to be infected with *Pythium ultimum* which had caused seed and seedling rot, while those treated with N-nitroso-phthalimidine were free of this disease.

Example II

The N-nitroso-phthalimidine is also effective as a control of *Urocystis cepulae* (onion smut). A number of onion seeds were treated with 1% by seed weight of N-nitroso-phthalimidine and planted in greenhouse soil heavily infected with onion smut. At the same time a number of untreated seeds were also planted in the infested soil. After 24 days the number of seedlings infected with smut was compared with those free of the disease. It was found that only 36% of the seedlings which had been treated with N-nitroso-phthalimidine were infected with the disease, whereas the seedlings which grew from the untreated seed were 97% infected.

Example III

The evaluation of N-nitroso-phthalimidine against several commonly occurring fungi using the "slide technique" described by S. E. A. McCallan et al., Contributions of Boyce-Thompson Institute 4, 233 (1932); 9, 249 (1938); 10, 329 (1939); 12, 49 (1941); 12, 431 (1942) is given in the following table:

| Fungus treated | N-Nitroso-phthalimidine, parts per million | Per cent ungerminated spores | |
|---|---|---|---|
| | | Treated | Untreated |
| *Alternaria solani* | 4 | 100 | 19 |
| *Helminthosporium sp.* | 3,686 | 100 | 3 |
| *Metarrhizium sp.* | 4 | 54 | 0 |
| *Sclerotinia fructicola* | 16 | 98 | 1 |
| *Stachybotrys sp.* | 1 | 100 | 10 |

Example IV

This case illustrates the effectiveness of N-nitroso-phthalimidine as a bactericide. Five percent by weight of finely ground N-nitroso-phthalimidine was suspended in water which contained 2% of Emulphor EL (believed to be reaction product of fatty acid or fatty acid ester with ethylene oxide) as a dispersing agent. A section of potato was immersed in this suspension and allowed to stand at room temperature. No growth of natural occurring bacteria was observed during 30 days. On the other hand, a section of potato treated in a similar manner with a 2% solution of Emulphor EL in water, which solution did not contain a germicide, became heavily overgrown with naturally occurring bacteria within the same period of time.

Example V

The mildewproofing properties of N-nitrophthalimidine are shown by the following test. A piece of cotton fabric was dipped in a 2% solution of N-nitroso-phthalimidine in acetone and then allowed to dry until the acetone was completely removed. It was inoculated with *Chaetomium globosum* spore suspension and incubated in agar medium for twenty days. During this time no growth appeared on the sample. On the other hand, cotton fabric which was not treated or treated only with acetone, and then inoculated and incubated with the same fungus under the same conditions, showed heavy growth of the mildew within the same period of time.

Example VI

The insect repellent properties of N-nitroso-phthalimidine are shown by the following test. Four pieces of woolen cloth (1½"x4') were immersed in a 5% solution of N-nitroso-phthalimidine in acetone until saturated with the solution, then removed, air dried to remove the acetone, and each placed in a covered Petri dish containing five black carpet beetle larvae, and allowed to stand in a dark place at room temperature for three weeks. Four similar pieces of untreated woolen cloth were placed in separate Petri dishes each containing five black carpet beetle larvae, and then allowed to stand for three weeks under the same conditions. At the end of this period it was found that no visible feeding had occurred on the treated samples, whereas very heavy feeding had occurred on the untreated samples.

Having thus described my invention, what I claim and desire to protect by Letters Patent is:

1. An insect repellent composition comprising a carrier and N-nitroso-phthalimidine as an active ingredient.

2. A fungicidal composition comprising a carrier and N-nitroso-phthalimidine as an active ingredient.

3. A fungicidal composition comprising a liquid carrier and N-nitroso-phthalimidine as an active ingredient.

4. A germicidal preparation comprising an aqueous suspension of N-nitroso-phthalimidine containing a dispersing agent.

5. The method of repelling insects from plants which comprises treating plants with N-nitroso-phthalimidine.

6. The method of protecting seeds, plants, and soil subject to attack or infestation by fungi which comprises treating said material with N-nitroso-phthalimidine.

7. The method of immunizing seed which comprises treating said seed with N-nitroso-phthalimidine.

8. The method of controlling fungi on plants which comprises treating said plants with N-nitroso-phthalimidine.

9. The method of destroying fungus which comprises subjecting said fungus to the action of N-nitroso-phthalimidine.

10. The method of controlling mildew on organic material which comprises treating said organic material with N-nitroso-phthalimidine.

11. The method of combating insects which comprises applying N-nitroso-phthalimidine to the insect host.

ELBERT C. LADD.